United States Patent
Kang

(10) Patent No.: US 8,472,080 B2
(45) Date of Patent: Jun. 25, 2013

(54) IMAGE FORMING METHOD AND SYSTEM FOR PERFORMING DIFFERENT HALFTONING PROCESSES ACCORDING TO DEVELOPER

(75) Inventor: Ki-min Kang, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 344 days.

(21) Appl. No.: 12/605,529

(22) Filed: Oct. 26, 2009

(65) Prior Publication Data

US 2010/0103466 A1    Apr. 29, 2010

(30) Foreign Application Priority Data

Oct. 27, 2008    (KR) .................. 10-2008-0105403

(51) Int. Cl.
*G06K 15/00* (2006.01)
(52) U.S. Cl.
USPC .......... 358/3.06; 358/3.03; 358/1.9; 358/534; 358/536; 358/3.1
(58) Field of Classification Search
USPC ....................................................... 358/536
See application file for complete search history.

(56) References Cited

U.S. PATENT DOCUMENTS

| | | | | |
|---|---|---|---|---|
| 5,963,714 A * | 10/1999 | Bhattacharjya et al. | ....... | 358/1.9 |
| 6,763,144 B1 * | 7/2004 | Gershony | ....... | 382/274 |
| 6,844,941 B1 * | 1/2005 | Sharma et al. | ....... | 358/1.9 |
| 7,298,525 B2 | 11/2007 | Hagai et al. | | |
| 7,384,205 B2 * | 6/2008 | Oki | ....... | 400/76 |
| 7,661,787 B2 * | 2/2010 | Hoshiyama et al. | ....... | 347/19 |
| 7,791,766 B2 * | 9/2010 | Hiramoto et al. | ....... | 358/3.19 |
| 7,936,481 B2 * | 5/2011 | Nakatani et al. | ....... | 358/3.1 |
| 2003/0053098 A1 * | 3/2003 | Hagai et al. | ....... | 358/1.9 |
| 2005/0122535 A1 * | 6/2005 | Oki | ....... | 358/1.9 |
| 2007/0216919 A1 * | 9/2007 | Sato et al. | ....... | 358/1.9 |

FOREIGN PATENT DOCUMENTS

| | | |
|---|---|---|
| JP | 10-224629 | 8/1998 |
| JP | 2005-110233 | 4/2005 |

OTHER PUBLICATIONS

Korean Office Action dated Dec. 13, 2012 issued in KR Application No. 10-2008-0105403.

\* cited by examiner

*Primary Examiner* — Dung Tran
(74) *Attorney, Agent, or Firm* — Stanzione & Kim, LLP

(57) ABSTRACT

A printing method, and an image forming apparatus and image forming system to perform the method, the method including performing a multi-bit halftoning of a pixel of image data if the pixel is to be printed with a dark developer, performing a single-bit halftoning of the pixel if the pixel is to be printed with a light developer, and printing the halftoned image data.

25 Claims, 5 Drawing Sheets

IMAGE FORMING METHOD AND SYSTEM FOR PERFORMING DIFFERENT HALFTONING PROCESSES ACCORDING TO DEVELOPER

CROSS-REFERENCE TO RELATED APPLICATIONS

This application claims the benefit under 35 U.S.C. §119(a) of Korean Patent Application No. 10-2008-0105403, filed on Oct. 27, 2008, in the Korean Intellectual Property Office, the disclosure of which is incorporated herein by reference in its entirety.

BACKGROUND

1. Field of the Invention

The present general inventive concept relates to an image forming apparatus, an image forming system and a printing method thereof, and more particularly, to an image forming apparatus, an image forming system and a printing method thereof which reduces printing time.

2. Description of the Related Art

An image forming system includes a host device such as a computer or a personal digital assistant (PDA), and an image forming apparatus such as a printer which prints image data received from the host device on a print medium. The image forming apparatus may form a color image with developers (toner or ink), typically in four colors including yellow (Y), magenta (M), cyan (C), and black (K).

Recently, image forming apparatuses that improve the quality of color images with developers have been developed. Some colors of the developers have different gradations.

More specifically, a developer in the yellow (Y) color is classified into a dark yellow color and a relatively light yellow color to perform a color print.

In such a case, the image data which is received from the host device is continuous tone image data with 255 gradations, and thus goes through an image processing called halftoning to be converted into binary data.

A single-bit halftoning which represents only two gradations by on/off of dots has been mainly employed. Recently, however, a multi-bit halftoning which can represent more than two gradations has been developed with advanced hardware technology.

If the multi-bit halftoning is performed on the image data regardless of gradations of developers, a considerable amount of time may be required for the halftoning image processing.

Also, the multi-bit image data is larger than the single-bit image data in quantity, and print time may therefore be longer.

As for a light developer, even if an image is printed in at least three gradations, a user does not identify the gradations in the image as clearly as gradations in the image printed with a dark developer.

SUMMARY

Example embodiments of the present general inventive concept provide an image forming apparatus, an image forming system and a printing method thereof which reduces image processing time and printing time while maintaining a quality of a color image.

Additional features and utilities of the present general inventive concept will be set forth in part in the description which follows and, in part, will be obvious from the description, or may be learned by practice of the present general inventive concept.

The foregoing and/or other features and utilities of the present general inventive concept may be achieved by providing a printing method of an image forming apparatus, the printing method including performing a multi-bit halftoning of a pixel of image data if the pixel is to be printed with a dark developer, performing a single-bit halftoning of the pixel if the pixel is to be printed with a light developer, and printing the halftoned image data.

The dark developer may include at least one of cyan, magenta, yellow and black.

The light developer may include at least one of cyan, magenta, yellow and black.

The multi-bit halftoning may be performed within a range of 2-bits to 8-bits.

The foregoing and/or other features and utilities of the present general inventive concept may also be achieved by providing a printing method of an image forming system which includes an image forming apparatus and a host device that is connected to the image forming apparatus, the printing method including performing a multi-bit halftoning of a pixel of image data if the pixel is to be printed with a dark developer, performing a single-bit halftoning of the pixel if the pixel is to be printed with a light developer, and printing the halftoned image.

The method may include transmitting the halftoned image from the host device to the image forming apparatus, wherein the halftoned image is printed by the image forming apparatus.

The dark developer may include at least one of cyan, magenta, yellow and black.

The light developer may include at least one of cyan, magenta, yellow and black.

The multi-bit halftoning may be performed within a range of 2-bits to 8-bits.

The foregoing and/or other features and utilities of the present general inventive concept may also be achieved by providing an image forming apparatus including an acquiring unit which acquires image data, a print unit which prints an image corresponding to the image data on a print medium by using a dark developer and a light developer, and a controller which performs a multi-bit halftoning of a pixel of the image data if the pixel is to be printed with the dark developer, performs a single-bit halftoning of the pixel if the pixel is to be printed with the light developer and controls the print unit to print the halftoned image.

The dark developer may include at least one of cyan, magenta, yellow and black.

The light developer may include at least one of cyan, magenta, yellow and black.

The multi-bit halftoning may be performed within a range of 2-bits to 8-bits.

The acquiring unit may include at least one of a communication unit which receives the image data from the host device connected with the image forming apparatus, and a scanning unit which scans a document and generates the image data.

The foregoing and/or other features and utilities of the present general inventive concept may also be achieved by providing an image forming system including a host device to perform a multi-bit halftoning of a pixel of image data if the pixel is to be printed with the dark developer, to perform a single-bit halftoning of the pixel if the pixel is to be printed with the light developer and to transmit the halftoned image data, and an image forming apparatus to receive and print the halftoned image data.

The multi-bit halftoning may be performed within a range of 2-bits to 8-bits.

The foregoing and/or other features and utilities of the present general inventive concept may also be achieved by providing a recording medium having recorded thereon a program to cause a computer to perform a printing method with an image forming apparatus, the method including performing a multi-bit halftoning of a pixel of image data if the pixel is to be printed with a dark developer, performing a single-bit halftoning of the pixel if the pixel is to be printed with a light developer, and printing the halftoned image data.

The foregoing and/or other features and utilities of the present general inventive concept may also be achieved by providing a method of processing image data to be used by an image forming apparatus, the method including multi-bit halftoning a pixel of the image data that is to be printed with a dark developer, and single-bit halftoning a pixel of the image data that is to be printed with a light developer.

The single-bit halftoning may include a screening operation with produces one of two values to represent multiple gradations of a pixel color.

The multi-bit halftoning may include a screening operation which produces one of three or more values that each represent two or more gradations of a pixel color.

The multi-bit and single-bit halftoning may be performed by a host apparatus, and the processed image data may be transmitted to the image forming apparatus to be printed.

The multi-bit and single-bit halftoning may be performed by the image forming apparatus after receiving the image data from a host apparatus.

The multi-bit and single-bit halftoning may be performed by the image forming apparatus in a scanning operation performed by the image forming apparatus.

The foregoing and/or other features and utilities of the present general inventive concept may also be achieved by providing an image forming apparatus including a print unit to print up to two gradations of a first color, and three or more gradations of a second color, and a controller to control the print unit according to halftoned image data.

The controller may multi-bit halftone a pixel of image data that is to be printed in the second color, and may single-bit halftone a pixel of image data that is to be printed in the first color.

The image forming apparatus may further include a communication unit to receive the halftoned image data, wherein a pixel of image data that is to be printed in the first color is single-bit halftoned, and a pixel of image data that is to be printed in the second color is multi-bit halftoned.

The foregoing and/or other features and utilities of the present general inventive concept may also be achieved by providing an image data processing apparatus including a receiver to receive image data, and a controller to single-bit halftone a pixel of the image data that is to be printed in a first color, and to multi-bit halftone a pixel of the image data that is to be printed in a second color.

The foregoing and/or other features and utilities of the present general inventive concept may also be achieved by providing a method of processing image data, the method including single-bit halftoning a pixel of the image data that is to be printed in a first color, multi-bit halftoning a pixel of the image data that is to be printed in a second color, and printing the processed image on a printing medium.

BRIEF DESCRIPTION OF THE DRAWINGS

The above and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
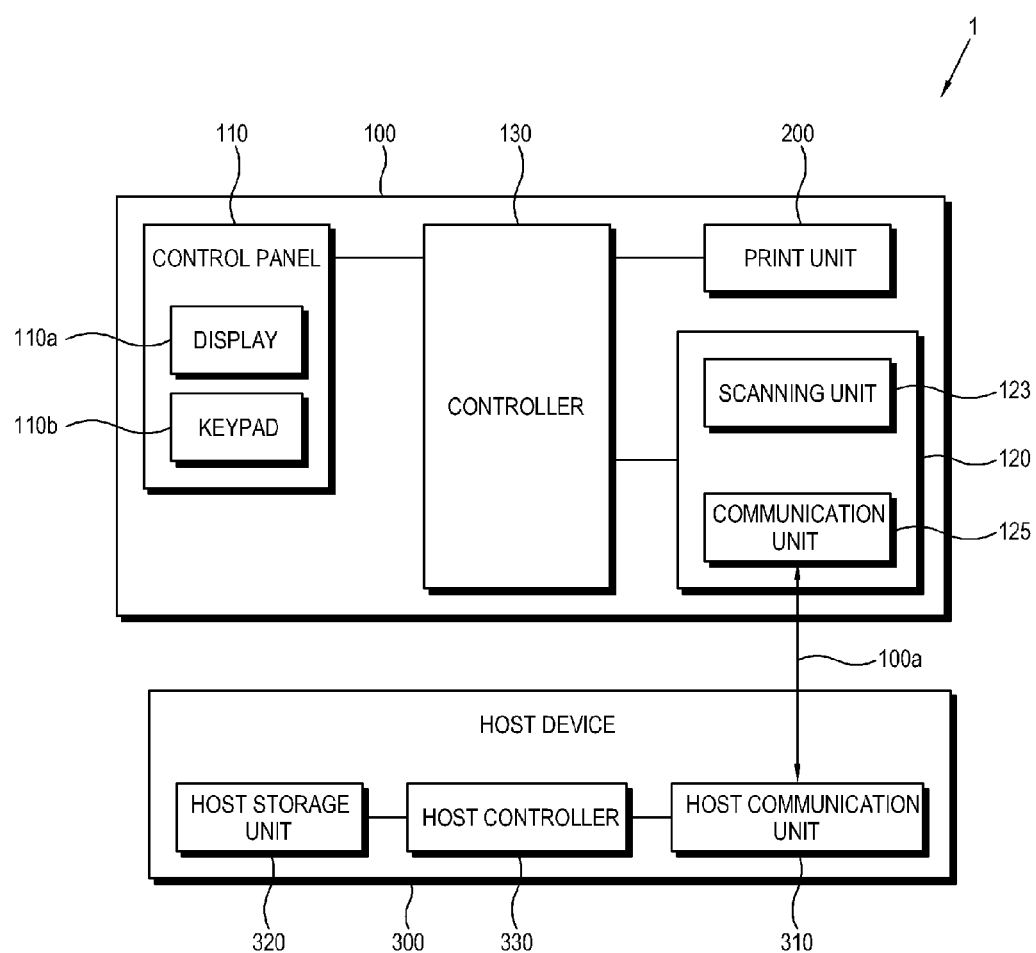
FIG. 1 is a block diagram illustrating an image forming system according to the present general inventive concept.

Reference will now be made in detail to various exemplary embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image forming system according to the present general inventive concept.

As shown in FIG. 1, an image forming system 1 according to an exemplary embodiment of the present invention may include an image forming apparatus 100 and a host device 300 which is connected with the image forming apparatus 100 to communicate therewith.

The image forming apparatus 100 may include a control panel 110, an acquiring unit 120 which may acquire image data, a print unit 200 which may print an image on a print medium with a dark developer and a light developer, and a controller 130 which may control the image forming apparatus 100 as a whole.

The control panel 110 may include a display window 110a and an input such as a keypad 110b. A user may input a scan command or a copy command for a document through the control panel 110. Although FIG. 1 illustrates the control panel 110 as including the display 110a and keypad 110b, it is possible that the display 110a and/or the keypad 110b can be disposed outside the image forming apparatus 100, and can be connected to the control panel 110 and/or the controller 130.

The acquiring unit 120 may include at least one of a communication unit 125 and a scanning unit 123.

The communication unit 125 may receive image data from a host communication unit 310 of the host apparatus 300 through a communication line 100a, for example, a wired or wireless network, and the image data may be printed on a printing medium by the print unit 200. The communication unit 125 may include at least one of a serial port, a parallel port, a universal serial bus (USB) port, a network interface card, etc.

The scanning unit 123 may scan an image of a document and generate image data. The scanning unit 123 may include at least one of a charge coupled device (CCD) sensor, a contact image sensor, a complementary metal-oxide semiconductor (CMOS) sensor, etc. The scanning unit 123 may include a color image sensor to generate color image data. The scanned image of the document may be sent to the print unit 200 as the image data to be printed on a printing medium and/or to the host device 300 through the communication unit 125 if the image data to be further processed.

The controller 130 may halftone the image data received from the acquiring unit 120, and may control the print unit 200 to print the halftoned image on a printing medium.

For the purpose of this discussion, it is assumed that the image data includes 8-bit continuous tone image data in red, green, and blue (RGB) colors. However, the present general inventive concept is not limited thereto. The image data may include tone image data in different colors other than RGB colors.

Figure 2:
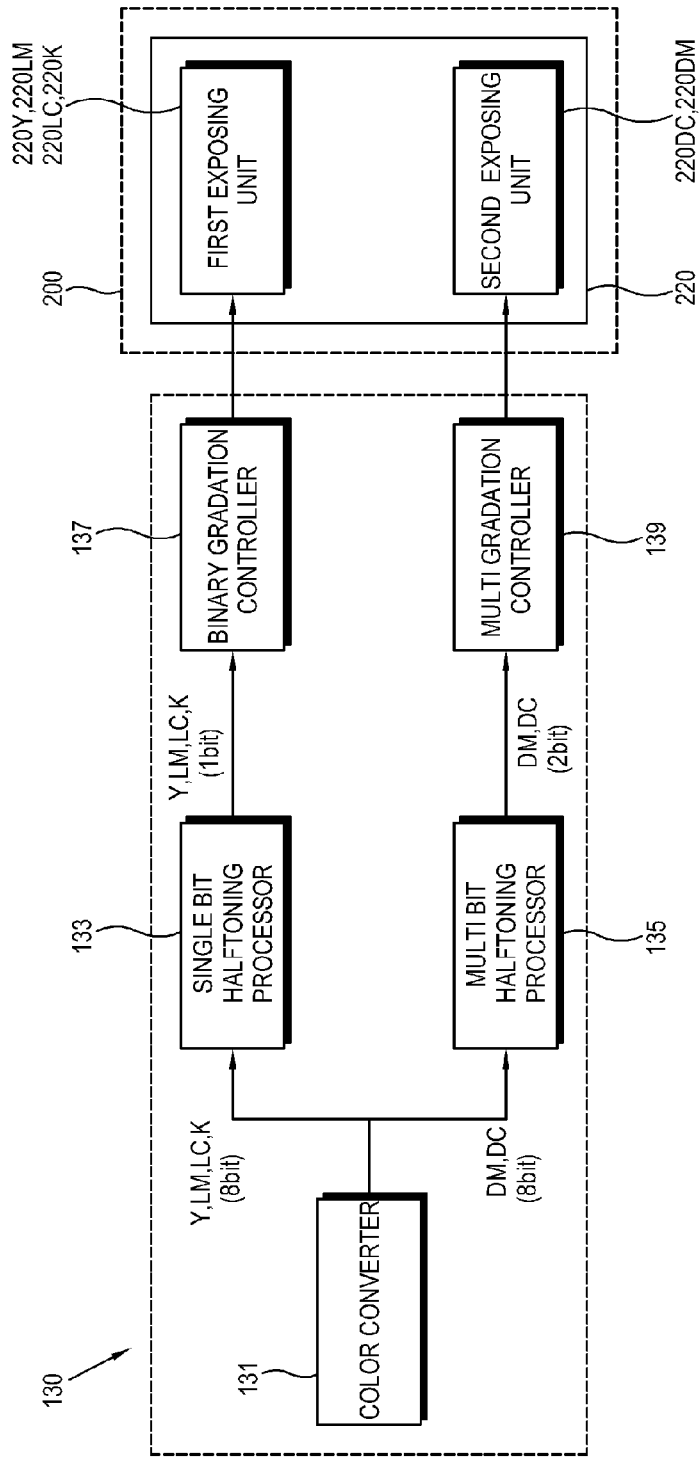
FIG. 2 is a block diagram illustrating portions of an image forming apparatus of the image forming system illustrated in FIG. 1.
Figure 3:
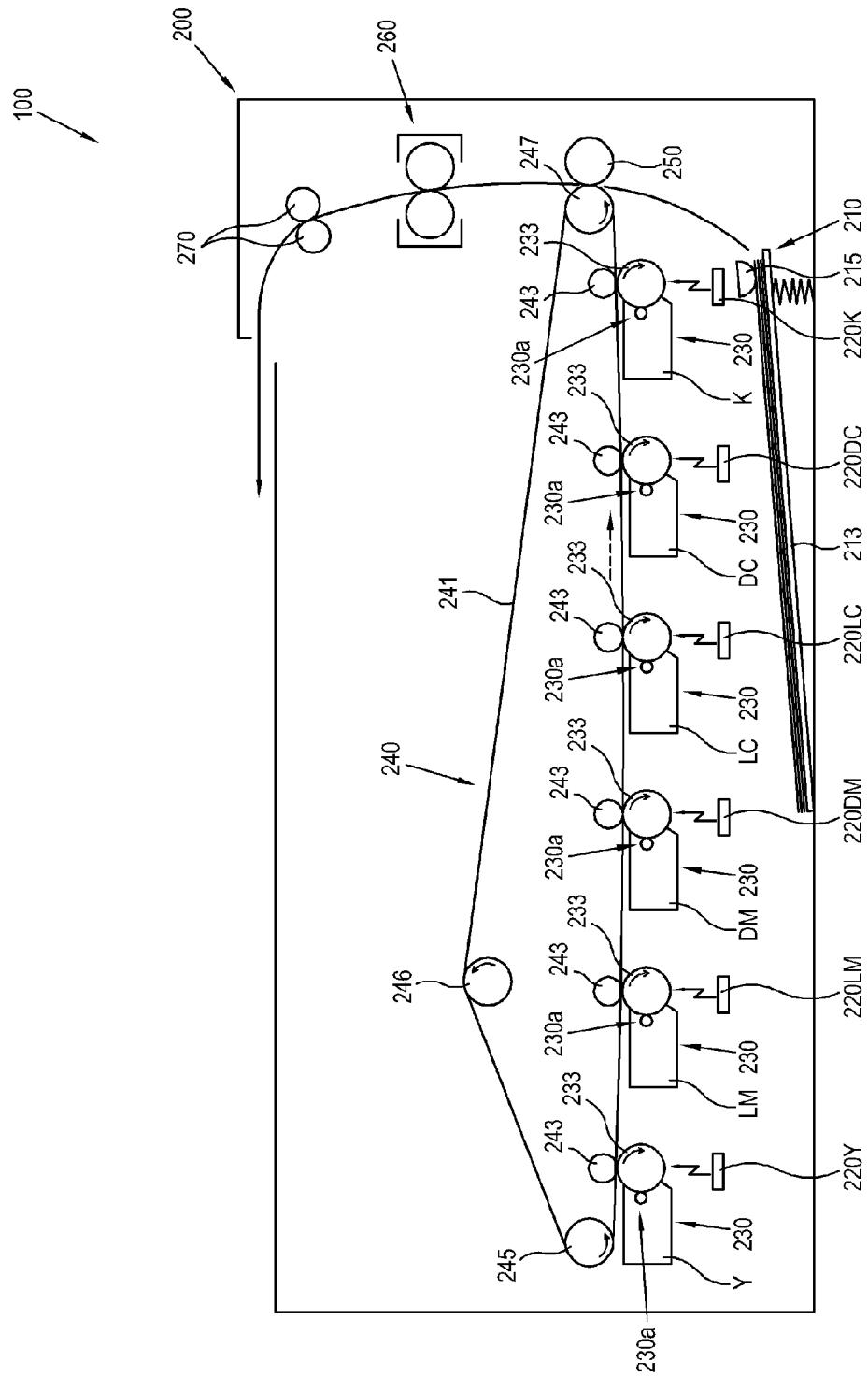
FIG. 3 is a sectional view illustrating the image forming apparatus of the image forming system illustrated in FIG. 1.

FIG. 2 is a block diagram illustrating portions of an image forming apparatus of the image forming system illustrated in FIG. 1, and FIG. 3 is a sectional view illustrating the image forming apparatus of the image forming system illustrated in FIG. 1. As illustrated in FIG. 2, the controller 130 may include a color converter 131 which may convert the image data in the RGB colors into image data corresponding to colors of a developer stored in the print unit 200, a single-bit halftoning processor 133, a multi-bit halftoning processor 135, a binary gradation controller 137, and a multi-gradation controller 139. If the image data includes 8-bit continuous gradation image data in a gray color, the color converter 131 may be excluded from the controller 130. In such a configuratione, the print unit 200 may print an image with two developers in a light black color and a dark black color by varying the gradation of a black (K) color developer. However, the color converter 131 may be included to perform an operation of converting the color image data to black and white image data or an operation of changing the gradation of the black and white image data.

The single-bit halftoning processor 133 may perform a single-bit halftoning on a pixel of image data corresponding to a light color included in the data converted by the color converter 131. In such a case, the image data corresponding to the light color may be printed with a developer in a light color in the print unit 200 (to be described later). For example, image data in a light cyan (LC) color may be printed by a developer in an LC color.

More specifically, as illustrated in FIG. 2, the single-bit halftoning processor 133 may receive image data in, for example, the LC color and a light magenta (LM) color with 255 gradations (8 bits) converted by the color converter 131, and may perform a single-bit halftoning on the image data and output 1-bit binary data with 2 gradations (having a value of 0 or 1, for example). Accordingly, the quantity of data is reduced and print speed is faster than multi-bit image data with multiple gradations.

The image forming apparatus 100 may further include a memory such as a random access memory (RAM) connected to the controller 130 to temporarily store therein the halftoned image data. As a memory with a smaller capacity may be used, cost cuts may be achieved.

The halftoning method may include screening and/or error diffusion. However, the present general inventive concept is not limited thereto. The halftoning method may include other known single-bit halftoning either in combination with, or as a substitute for, these methods.

Screening is a method that compares a gradation value of pixels of the color-converted image data with a preset screen (threshold) and generates binary data to represent the gradation value. The single-bit halftoning method which uses screening will be described briefly. If a gradation value of a pixel in a screen is larger than a predetermined threshold of the screen, a value of 1 is outputted. The predetermined threshold may be arranged in every pixel of the screen. If the gradation value is smaller than the threshold, a value of 0 is outputted. Accordingly, 8-bit gradation is converted into 1-bit gradation with 0 or 1.

As illustrated in FIGS. 2 and 3, cyan may be classified as an LC color and a dark cyan (DC) color, and magenta may be classified as a light magenta (LM) color and a dark magenta (DM) color with respect to gradation, but the general inventive concept is not limited thereto. Alternatively, developers in all of the YMCK colors may be provided in different gradations or developers in one or more of the YMCK colors with different gradations may be provided.

The multi-bit halftoning processor 135 may perform a multi-bit halftoning on a pixel of image data corresponding to a dark color included in the data converted by the color converter 131. In such a case, the image data corresponding to the dark color may be printed with a developer in a dark color in the print unit 200 (to be described later). For example, the image data in a DC color may be printed with a developer in a DC color.

The multi-bit halftoning may include gradation values in a plurality of ranges from 2 to 8 bits. For example, if 2-bit halftoning is performed, three or four gradations may be expressed. Similarly, if 3-bit halftoning is performed, 5 to 8 gradations may be expressed.

More specifically, as illustrated in FIG. 2, the multi-bit halftoning processor 135 may receive image data in DC and DM colors with 255 gradations (8 bits) converted by the color converter 131, and may perform a 2-bit halftoning on the image data to generate binary data with, for example, 4 gradations (0, 1, 2 and 3). Such a multi-bit halftoning method with at least 3 gradations is known in the art.

If 2-bit halftoning is to be performed by using the screening method, 2 or 3 screens (thresholds) may be used instead of one screen. If 3 screens are used, the gradation value of a pixel of the DC image data may be compared with a threshold of three screens. If all of the two bit values are used, i.e., the 3 screens are used in the comparison, 2-bit halftoning which has a total of four gradations of 0(2 bit: [00]), 1(2 bit: [01]), 2(2 bit: [10]) and 3(2 bit: [11]) is available. If two screens are used, 2-bit halftoning which has three gradations of 0, 1 and 2 is available.

In a case in which image data includes colors without gradations, e.g., the image data in yellow (Y) and black (K) colors as illustrated in FIG. 2, these colors without gradations may be halftoned in two gradations by the single-bit halftoning processor 133. The image data in colors without gradation may also be halftoned in multi-gradations with at least two bits by the multi-bit halftoning processor 135.

As illustrated in FIG. 2, the print unit 200 may include an exposing unit 220 to receive image data from the controller 130. The exposing unit 220 may include first exposing units 220Y, 220LM, 220LC, and 220K, and second exposing units 220DC and 220DM.

The binary gradation controller 137 may supply a first exposing signal corresponding to the 1-bit image data outputted by the single-bit halftoning processor 133 to first exposing units 220Y, 220LM, 220LC and 220K of the exposing unit 220 of the print unit 200 at a proper timing.

The timing may be determined to form a desired color image with 1-bit image data Y, LM, LC and K in various colors overlapping each other.

The multi gradation controller 139 may supply a second exposing signal corresponding to multi bits outputted by the multi-bit halftoning processor 135, e.g., 2-bit image data to second exposing units 220DM and 220DC of the exposing unit 220 of the print unit 200.

Although the cyan and magenta are the colors described as being converted into light and dark colors, the present general inventive concept is not limited thereto. For example, only one of these colors may be converted into light or dark colors, or other colors may be converted into the light and dark colors and processed accordingly.

In the case of the 1-bit image data including 0 and 1, the first exposing signal may include a pulse signal of 0 (off) and 1 (on), and a width of each pulse may be constant.

In the case of the 2-bit image data of 0, 1, 2 and 3, the second exposing signal may include a pulse signal of 0 (off) and 1 (on), similar to the first exposing signal, but a width of each pulse may be different. For example, the value of 1 in the 2-bit image data may have a ⅓ pulse width compared to that of 3, while 2 may have a pulse width of ⅔ compared to that of 3. The multi gradation controller 139 may control the second exposing units 220DM and 220DC to modulate a pulse width of a laser emitted by the second exposing units 220DM and 220DC corresponding to the multi-bit image data outputted by the multi-bit halftoning processor 135.

The pulse width corresponding to a value of 1 in the 1-bit image data may be the same as that corresponding to 3 of the 2-bit image data.

As illustrated in FIG. 3, the print unit 200 may print an image on a print medium by an electrophotographic method. The printing method may be replaced with at least one of an inkjet method jetting ink through a nozzle and a thermal transfer method using a thermal printing head. The print unit 200 may further include at least one of the aforementioned inkjet method and thermal transfer method to use two types of image forming methods.

The print unit 200 may include a print medium feeding unit 210, a plurality of exposing units 220Y, 220LM, 220DM, 220LC, 220DC and 220K, a plurality of developing cartridges 230, an intermediate transfer unit 240, a final transfer roller 250, a fusing unit 260, and a print medium discharging unit 270.

The print medium feeding unit 210 may include a plate 213 to load a print medium thereon and a pickup roller 215 to pick up the print medium from the plate 213. The print medium feeding unit 210 may supply the picked-up print medium to the intermediate transfer unit 240 and the final transfer roller 250.

The plurality of exposing units 220Y, 220LM, 220DM, 220LC, 220DC and 220K may expose an image carrier 233 of the developing cartridges 230 according to an exposing signal supplied by the controller 130. The plurality of exposing units 220Y, 220LM, 220DM, 220LC, 220DC and 220K may include a light source (not shown) which emits a laser, a polygon mirror (not shown) which deflects the light source, and a light scanning unit including an f-θ lens (not shown) to focus the deflected light to a surface of the image carrier 233. The light source, polygon mirror, and light scanning unit with an f-θ lens are well known in the conventional art, and therefore detailed descriptions thereof will be omitted. The plurality of exposing units 220Y, 220LM, 220DM, 220LC, 220DC and 220K may include an optical array head including a plurality of light emitting diode (LED) lamps arranged in a lengthwise direction of the image carrier 233 of the plurality of developing cartridges 230.

The plurality of developing cartridges 230 may store therein a yellow (Y) developer, a light magenta (LM) developer, a dark magenta (DM) developer, a light cyan (LC) developer, a dark cyan (DC) developer and a black (K) developer in a rotation direction of the intermediate transfer belt 241 of the intermediate transfer unit 240.

The plurality of developing cartridges 230 may include the image carrier 233 whose surface is developed by the stored developers. When each image carrier 233 is respectively exposed by the exposing units 220Y, 220LM, 220DM, 220LC, 220DC and 220K, an electrostatic latent image is formed thereon. The electrostatic latent image is developed by a developing roller 230a of the plurality of developing cartridges 230 with the developer (for example, Y, LM, DM, LC, DC, K) respectively stored in the plurality of developing cartridges 230.

The intermediate transfer unit 240 may include the intermediate transfer belt 241, a plurality of intermediate transfer rollers 243 which may face the plurality of image carriers 233 leaving the intermediate transfer belt 241 therebetween, and driving rollers 245, 246 and 247 which rotate and drive the intermediate transfer belt 241.

Visual images which are formed on the surface of the plurality of image carriers 233 by the developers Y, LM, DM, LC, DC and K may be sequentially transferred to the intermediate transfer belt 241 by electrical attraction of the intermediate transfer roller 243.

Accordingly, a final color image which may include the developers Y, LK, DM, LC, DC and K is formed on the intermediate transfer belt 241.

The color image may be transferred by the final transfer roller 250 to a print medium that is fed by the print medium feeding unit 210.

The color image which is transferred to the print medium may be fused on the print medium by heat and pressure of the fusing unit 260.

Accordingly, the color-printed print medium is discharged to the outside of the image forming apparatus through the print medium discharging unit 270.

As described above, the print unit 200 may the electrophotographic type of printing, but is not limited thereto. Alternatively, for example, the print unit 200 may employ an inkjet type of printing.

If the inkjet type of printing is employed, the print unit 200 may include an ink chamber (not shown) accommodating therein ink to be jetted, a heater (not shown) to heat ink of the ink chamber, a nozzle (not shown) formed in a side of the ink chamber, and a heater driver (not shown) applying power to the heater and driving the heater. Such printing components are known in the art, and are therefore not illustrated.

In such a inkjet configuration, the binary gradation controller 137 and the multi-gradation controller 139 of the controller 130 may control the heater driver instead of the first exposing units 220Y, 220LM, 220LC and 220K and the second exposing units 220DM and 220DC.

More specifically, if the halftoned image data includes 1-bit image data, a first heater driving pulse signal may be supplied to the heater driver corresponding to the 1-bit image data. If the halftoned image data includes multi-bit image data including at least 2 bits, a second heater driving pulse signal may be supplied to the heater driver corresponding to the multi-bit image data. A pulse width of the second heater driving pulse signal may be modulated corresponding to the multi-bit image data. Accordingly, the heating time of the heater is changed. As the heating time of the heater is changed, a drop size of ink jetted through the nozzle is changed and multi-gradation expression is available.

The controller 130 of the image forming apparatus 100 may perform the single-bit halftoning and multi-bit halftoning of RGB color image data, but the present general inventive concept is not limited thereto. Alternatively, for example, the host device 300 may perform the two halftoning processes.

More specifically, the host controller 330 may perform a single-bit halftoning and a multi-bit halftoning of the color image data and transmit the halftoned image data to the image forming apparatus 100 through the host communication unit 310 and the communication unit 125 in response to the host controller 330 receiving a print command regarding the RGB color image data stored in the host storage unit 320 of the host device 300. The single-bit halftoning and the multi-bit halftoning may be performed by a printer driver of the image forming apparatus 100 installed in the host storage unit 320.

As described above, if a pixel of the image data is to be printed with a dark developer, the multi-bit halftoning is performed on the pixel. If a pixel is to be printed with the light developer, the single-bit halftoning is performed on the pixel. However, the present general inventive concept is not limited to such a configuration.

The controller 130 of the image forming apparatus 100 may control the print unit 200 to print the halftoned image data in response to the halftoned image data being received through the communication unit 125.

Figure 4:
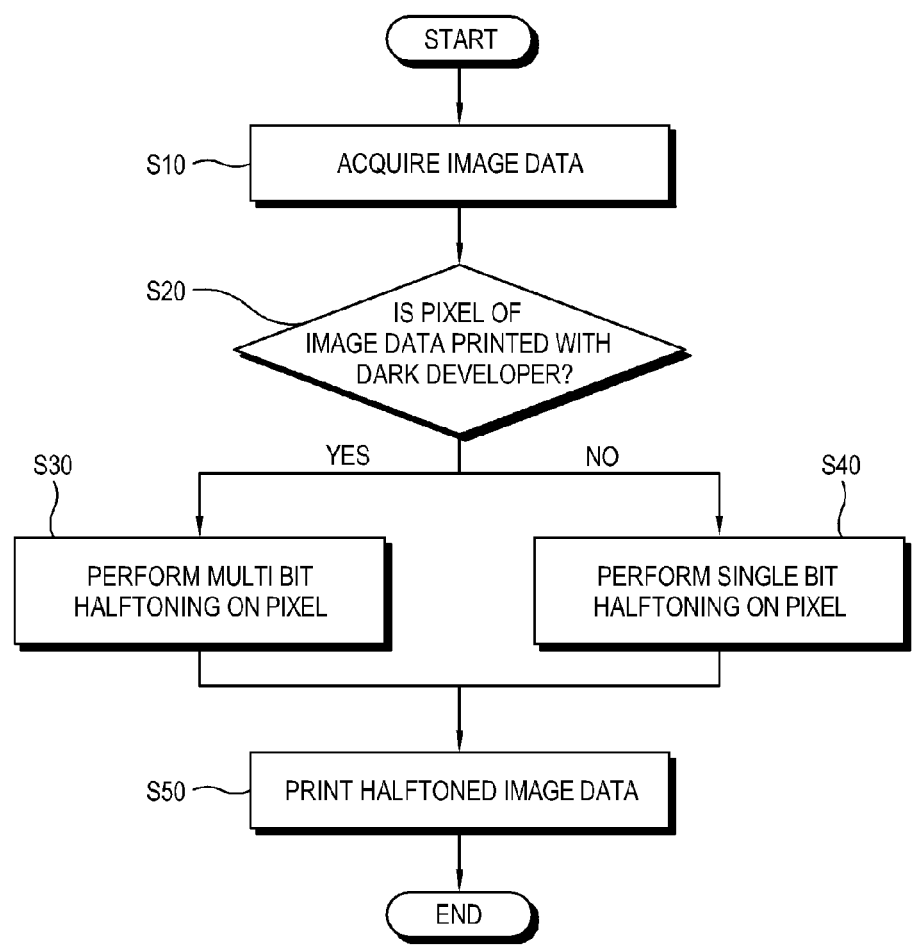
FIG. 4 is a flowchart illustrating a printing method of the image forming apparatus according to the present general inventive concept.

FIG. 4 is a flowchart illustrating a printing method of the image forming apparatus according to the present general inventive concept. This printing method will now be described in detail with reference to FIGS. 1 and 4.

First, image data is received (S10).

More specifically, continuous tone image data may be received from the host device 300 through the communication unit 125, or an image of a document may be scanned by the scanning unit 123 to form the image data.

The image data may include 8-bit continuous gradation image data. The image data may include color image data or mono gray image data.

It may be determined whether the pixel of the image data is to be printed with a dark developer (S20). To perform the operation, the image data may be classified into dark image data to be printed with a dark developer and light image data to be printed with a light developer, and then it may be determined whether the pixel of the image data is included in the dark image data or the light image data.

If the pixel of the image data is to be printed with the dark developer (YES in the operation S20), the multi-bit halftoning may be performed on the pixel (S30).

If the pixel of the image data is not to be printed with the dark developer (NO in the operation S20), the pixel is therefore to be printed with a light developer. In this situation, the single-bit halftoning may be performed on the pixel (S40).

Then, the halftoned image data may be printed (S50).

Figure 5:
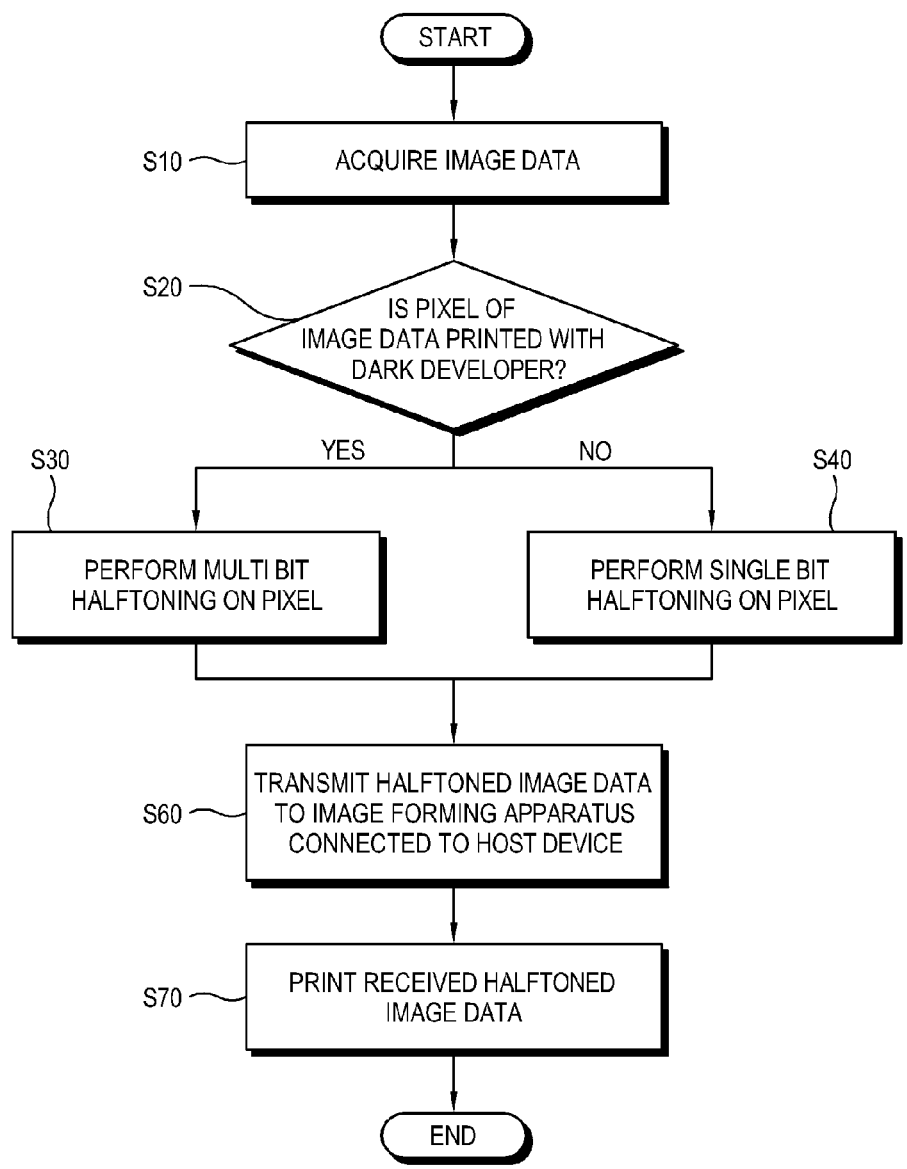
FIG. 5 is a flowchart illustrating another printing method of the image forming system according to the present general inventive concept.

FIG. 5 is a flowchart illustrating another printing method of the image forming system according to the present general inventive concept. As illustrated in FIGS. 1 and 5, this printing method may include the operations S10 to S40 of the previously described printing method of the image forming apparatus illustrated in FIG. 4. In this embodiment, however, an image processing apparatus which performs a halftone image processing may include halftoning of the image data performed by the host device 300 (refer to FIG. 1).

More particularly, the printing method of the image forming system 1 illustrated in FIG. 5 may further include an operation S60 of transmitting the halftoned image data from the host device 300 to the image forming apparatus 100.

This printing method of the image forming system 1 may further include an operation S70 of printing the halftoned image data received from the host device 300.

As described above, the image forming apparatus, the image forming system and the printing method thereof according to the present general inventive concept may have at least one or more of the following effects.

First, image processing time and print time may be reduced while a quality of a color image is maintained.

Second, the quantity of data to be processed is small compared with data that goes through a multi-bit halftoning regardless of gradation of a toner, and therefore the specification of internal electronic parts such as a memory and an image processor may be lowered and production costs may be reduced.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A printing method of an image forming apparatus, the printing method comprising:
    performing a multi-bit halftoning of a pixel of image data, if the pixel is to be printed with a dark developer, to output values of at least two bits to control the dark developer;
    performing a single-bit halftoning of the pixel if the pixel is to be printed with a light developer, the light developer comprising yellow, a light magenta, a light cyan, and black; and
    printing the halftoned image data.

2. The printing method according to claim 1, wherein the dark developer includes at least one of cyan, magenta, yellow and black.

3. The printing method according to claim 1, wherein the multi-bit halftoning is performed within a range of 2-bits to 8-bits.

4. A printing method of an image forming system which comprises an image forming apparatus and a host device that is connected to the image forming apparatus, the printing method comprising:
    multi-bit halftoning of a pixel of image data, if the pixel is to be printed with a dark developer, to output values of at least two bits to control the dark developer;
    single-bit halftoning of the pixel if the pixel is to be printed with a light developer, the light developer comprising yellow, a light magenta, a light cyan, and black; and
    printing the halftoned image.

5. The printing method according to claim 4, further comprising:

transmitting the halftoned image from the host device to the image forming apparatus, wherein the halftoned image is printed by the image forming apparatus.

6. The printing method according to claim 4, wherein the dark developer includes at least one of cyan, magenta, yellow and black.

7. The printing method according to claim 4, wherein the multi-bit halftoning is performed within a range of 2-bits to 8-bits.

8. An image forming apparatus comprising:
an acquiring unit which acquires image data;
a print unit which prints an image corresponding to the image data on a print medium using a dark developer and a light developer, the light developer comprising yellow, a light magenta, a light cyan, and black; and
a controller which performs a multi-bit halftoning of a pixel of the image data, if the pixel is to be printed with the dark developer, to output values of at least two bits to control the dark developer performs a single-bit halftoning of the pixel if the pixel is to be printed with the light developer, and controls the print unit to print the halftoned image.

9. The image forming apparatus according to claim 8, wherein the dark developer includes at least one of cyan, magenta, yellow and black.

10. The image forming apparatus according to claim 8, wherein the multi-bit halftoning is performed within a range of 2-bits to 8-bits.

11. The image forming apparatus according to claim 8, wherein the acquiring unit comprises:
at least one of a communication unit which receives the image data from a host device connected with the image forming apparatus, and a scanning unit which scans a document and generates the image data.

12. The image forming apparatus according to claim 9, wherein the acquiring unit comprises:
at least one of a communication unit which receives the image data from a host device connected with the image forming apparatus, and a scanning unit which scans a document and generates the image data.

13. An image forming system comprising:
a host device to perform a multi-bit halftoning of a pixel of image data to output values of at least two bits to control a dark developer if the pixel is to be printed with the dark developer, to perform a single-bit halftoning of the pixel if the pixel is to be printed with a light developer, the light developer comprising yellow, a light magenta, a light cyan, and black, and to transmit the halftoned image data, and
an image forming apparatus to receive and print the halftoned image data.

14. The image forming system according to claim 13, wherein the multi-bit halftoning is performed within a range of 2-bits to 8-bits.

15. A non-transitory recording medium having recorded thereon a program to cause a computer to perform a printing method with an image forming apparatus, the method comprising:
performing a multi-bit halftoning of a pixel of image data, if the pixel is to be printed with a dark developer, to output values of at least two bits to control the dark developer;
performing a single-bit halftoning of the pixel if the pixel is to be printed with a light developer, the light developer comprising yellow, a light magenta, a light cyan, and black; and
printing the halftoned image data.

16. A method of processing image data to be used by an image forming apparatus, the method comprising:
multi-bit halftoning a pixel of the image data that is to be printed with a dark developer to output values of at least two bits to control the dark developer; and
single-bit halftoning a pixel of the image data that is to be printed with a light developer, the light developer comprising yellow, a light magenta, a light cyan, and black.

17. The method of claim 16, wherein the single-bit halftoning includes a screening operation which produces one of two values to represent multiple gradations of a pixel color.

18. The method of claim 16, wherein the multi-bit halftoning includes a screening operation which produces one of three or more values that each represent two or more gradations of a pixel color.

19. The method of claim 16, wherein the multi-bit and single-bit halftoning are performed by a host apparatus, and the processed image data is transmitted to the image forming apparatus to be printed.

20. The method of claim 16, wherein the multi-bit and single-bit halftoning are performed by the image forming apparatus after receiving the image data from a host apparatus.

21. The method of claim 16, wherein the multi-bit and single-bit halftoning are performed by the image forming apparatus in a scanning operation performed by the image forming apparatus.

22. An image forming apparatus comprising:
a print unit to print up to two gradations using a light developer, the light developer comprising yellow, a light magenta, a light cyan, and black, and three or more gradations using a dark developer; and
a controller to control the print unit according to halftoned image data, wherein the controller multi-bit halftones a pixel of image data that is to be printed using the dark developer and single-bit halftones a pixel of image data that is to be printed using the light developer.

23. The image forming apparatus of claim 22, further comprising:
a communication unit to receive the halftoned image data.

24. An image data processing apparatus, comprising:
a receiver to receive image data; and
a controller to single-bit halftone a pixel of the image data that is to be printed using a light developer, the light developer comprising yellow, a light magenta, a light cyan, and black, and to multi-bit halftone a pixel of the image data that is to be printed using a dark developer to output values of at least two bits to control the dark developer.

25. A method of processing image data, the method comprising:
single-bit halftoning a pixel of image data that is to be printed using a light developer, the light developer comprising yellow, a light magenta, a light cyan, and black;
multi-bit halftoning a pixel of the image data that is to be printed using a second developer to output values of at least 2-bits to control the second developer; and
printing the processed image data on a printing medium.

* * * * *